United States Patent [19]
Carter, Jr.

[11] Patent Number: 5,252,349
[45] Date of Patent: Oct. 12, 1993

[54] PROCESS FOR EXTRACTING COCOA BUTTER AND COCOA CAKE FROM COCOA BEANS

[76] Inventor: Charles F. Carter, Jr., P.O. Box 46, Ariton, Ala. 36311

[21] Appl. No.: 876,582

[22] Filed: Apr. 30, 1992

[51] Int. Cl.$^5$ .............................................. A23G 1/00
[52] U.S. Cl. .................... 426/482; 426/469; 426/479; 426/417; 426/631
[58] Field of Search ............... 426/482, 631, 483, 481, 426/465, 466, 467, 468, 469, 479, 489, 417

[56] References Cited

U.S. PATENT DOCUMENTS

| | | | |
|---|---|---|---|
| 1,006,913 | 10/1911 | Cooke | 426/469 |
| 2,278,471 | 4/1942 | Musher | 426/489 |
| 2,288,045 | 6/1942 | Stephene | 426/466 |
| 2,428,802 | 10/1947 | Jones | 426/469 |
| 3,904,777 | 9/1975 | Goerling | 426/482 |
| 4,281,027 | 7/1981 | Inoue | 426/631 |

FOREIGN PATENT DOCUMENTS

| | | | |
|---|---|---|---|
| 660834 | 5/1987 | Fed. Rep. of Germany | 426/466 |
| 58-851 | 1/1983 | Japan | 426/631 |
| 2151454 | 7/1985 | United Kingdom | 426/631 |

OTHER PUBLICATIONS

Minifie 1980 Chocolate, Cocoa and Confectonery=-Science and Technology Second edition AVI Publishing Co. Inc. Westport, CT. pp. 28-59.

Primary Examiner—Carolyn Paden
Attorney, Agent, or Firm—James D. Long

[57] ABSTRACT

A process for extracting cocoa butter and cake from cocoa beans comprises cleaning a predetermined volume of cocoa beans by multiple screening and gravity separation. Subjecting the cleaned beans to heat and subsequently to cooling for a predetermined length of time to reduce the natural moisture trapped in the beans and concomitantly loosen affixed shell or hull particles surrounding the beans inner portion or nib. Passing the heated and cooled beans through a sizing station to divided the beans into different groups according to their size. Fracturing the cocoa beans along the natural fracture line of the beans inner portions or nib by passing each size group of beans in a controlled manner through centrifugal shattering unit. Separating the fractured nib and affixed hull fragments from each other. Preheating the fractured nib particles to a predetermined temperature. Compressing the preheated nib particles to extract unfiltered cocoa butter and cocoa cake. Filtering the cocoa butter to produce clean cocoa butter and fines material. Reclaiming the fines material to produce even greater nib yield from the receiving product.

13 Claims, 4 Drawing Sheets

PROCESS FOR EXTRACTING COCOA BUTTER AND COCOA CAKE FROM COCOA BEANS

TECHNICAL FIELD

This invention relates to a process for extracting cocoa butter and cake from cocoa beans and more particularly to an improved process for extracting cocoa butter and cake from cocoa beans which utilizes an improved centrifugal shell shattering unit to direct the cocoa beans being processed into contact with a clean target area at a force and velocity that will fracture substantially all the cocoa beans in one pass along natural fracture lines of the nib or inner portion of the cocoa beans.

BACKGROUND AND PRIOR ART

Cocoa beans are produced by cocoa trees which are found in a warm, moist climate in an area about 20° latitude north and south of the equator. The cocoa tree produces leaves, flowers and fruit in all seasons of the year. The ripe fruit or pod, resembles a long cantaloupe and contains twenty to forty almond-shaped cocoa seeds. Each cocoa seed comprises an inner portion or nib which is covered by a shell or hull. The smaller the cocoa bean the tighter the shell or hull is affixed by natural adhesion to its nib or inner portion. The shell or hull of the bean comprises about twelve to fifteen per cent of its weight while the nib and trapped moisture approximately eighty-five to eighty-eight percent. When these seeds are removed from the pods, fermented and dried, they become the commercial cocoa bean.

Various conventional processes heretofore have been employed to extract cocoa butter and cake from commercial cocoa beans. The initial steps of such processes attempt to clean and remove the naturally affixed shell or hull of the bean from its nib or inner portion. Such processes may utilize a disc type shell cracking apparatus as disclosed in U.S. Pat. No. 2,417,078(W. T. Jones) to shatter the cocoa beans along the natural fracture lines of its cocoa nib. Pressurized air systems have also been employed to transport a continuous volume of cleaned and roasted cocoa beans through an elongated tube or pipe and into contact with a flat target plate. As the cocoa beans strike the conventional flat target plate, they shatter and fracture(nib and affixed shell fragment) along the natural fracture lines of its nib. These type processes utilize equipment which is expensive to procure, construct and maintain and requires enormous amounts of energy to operate. Other problems have arisen with the use of conventional air transport systems due to the fact that they are designed to clean and fracture large volumes of cocoa beans very rapidly. As this large volume of cocoa beans strike the conventional target plate, some of the beans are prevented from properly contacting the stationary target plate due to the ricochet effect of the first portion of beans being fractured blocking the path of travel toward the target plate of a secondary portion of beans being processed. Accordingly, this secondary portion of beans is not fractured during its initial passage through the shattering step and must be recycled or as in most cases, continues on through the process as unfractured beans. This reduces the efficiency of this type process to produce cocoa butter and cocoa cake free of unfractured cocoa beans and shell fragments.

New state and federal carcinogenic health standards limit the amount of cocoa shell or hull in the collected cocoa nib to less than 1.75 percent by weight. Accordingly, additional screening and more efficient shell cracking equipment would have to be employed as additional recycling steps to these conventional processes to approach compliance with these standards.

DISCLOSURE OF THE INVENTION

In accordance with my present invention, I overcome the above and other difficulties by providing an improved process for extracting cocoa butter and cake from cocoa beans which is economical of operation and utilizes energy efficient centrifugal shattering devices to fracture in one pass, substantially all the cocoa beans being processed along the natural fracture lines of its nib.

It is a primary object of my invention to provide desired size pieces of cocoa nib free of affixed hull or shell more efficiently and at a substantially reduced cost of equipment procurement and installation as compared with equipment procurement and installation costs utilized in conventional processes heretofore employed.

The preferred form of my improved process comprises cleaning a predetermined volume of beans in a controlled environment. Subjecting the cleaned beans to heat and subsequently to cooling for a predetermined length of time to reduce the natural moisture trapped in the beans and concomitantly, loosen the affixed shell or hull from its nib. Passing the beans through to a sizing step to divide the beans into a plurality of groups according to their physical size characteristics. Fracturing the cocoa beans along the natural fracture of its nib by passing each group of sized beans in a controlled manner through a centrifugal shattering device which operates at a predetermine speed, dependent on the size and quality of bean being fractured, to break the beans into desired size pieces of nib and hull. Separating the fractured nib and hull fragments from each other by multiple screening and specific gravity separation. Reclaiming desirable nib from hull and nib fragments discarded by the multiple screening and specific gravity separation. Preheating the cleaned nib to a predetermined temperature to facilitate cocoa butter and cake extraction from the nib. Compressing the preheated cocoa nib to extract cocoa cake and unpurified cocoa butter. Filtering the unpurified cocoa butter to produce clean cocoa butter. Reclaiming the fines material discarded in filtering the cocoa butter to produce even greater nib yield from the receiving product.

BRIEF DESCRIPTION OF THE DRAWINGS

This invention is illustrated by the accompanying drawings, forming a part of this application, in which.

BEST MODE FOR CARRYING OUT THE INVENTION

Figure 1:
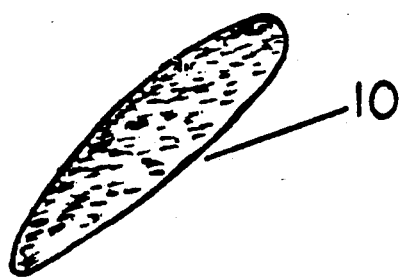
FIG. 1 is an elevation view of a typical cocoa bean.
Figure 2:
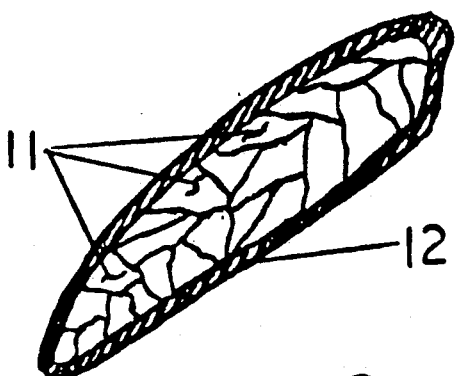
FIG. 2 is cross-sectional view of a cocoa bean showing the outer shell and natural fracture lines of the bean.
Figure 3:
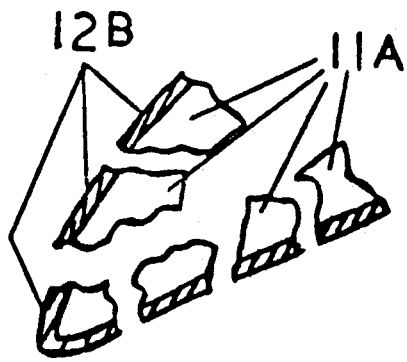
FIG. 3 is enlarged, fragmented cross-sectional view showing pieces of cocoa nib and hull from one end of a bean which have been fractured along the natural fracture lines of the nib.
Figure 4:
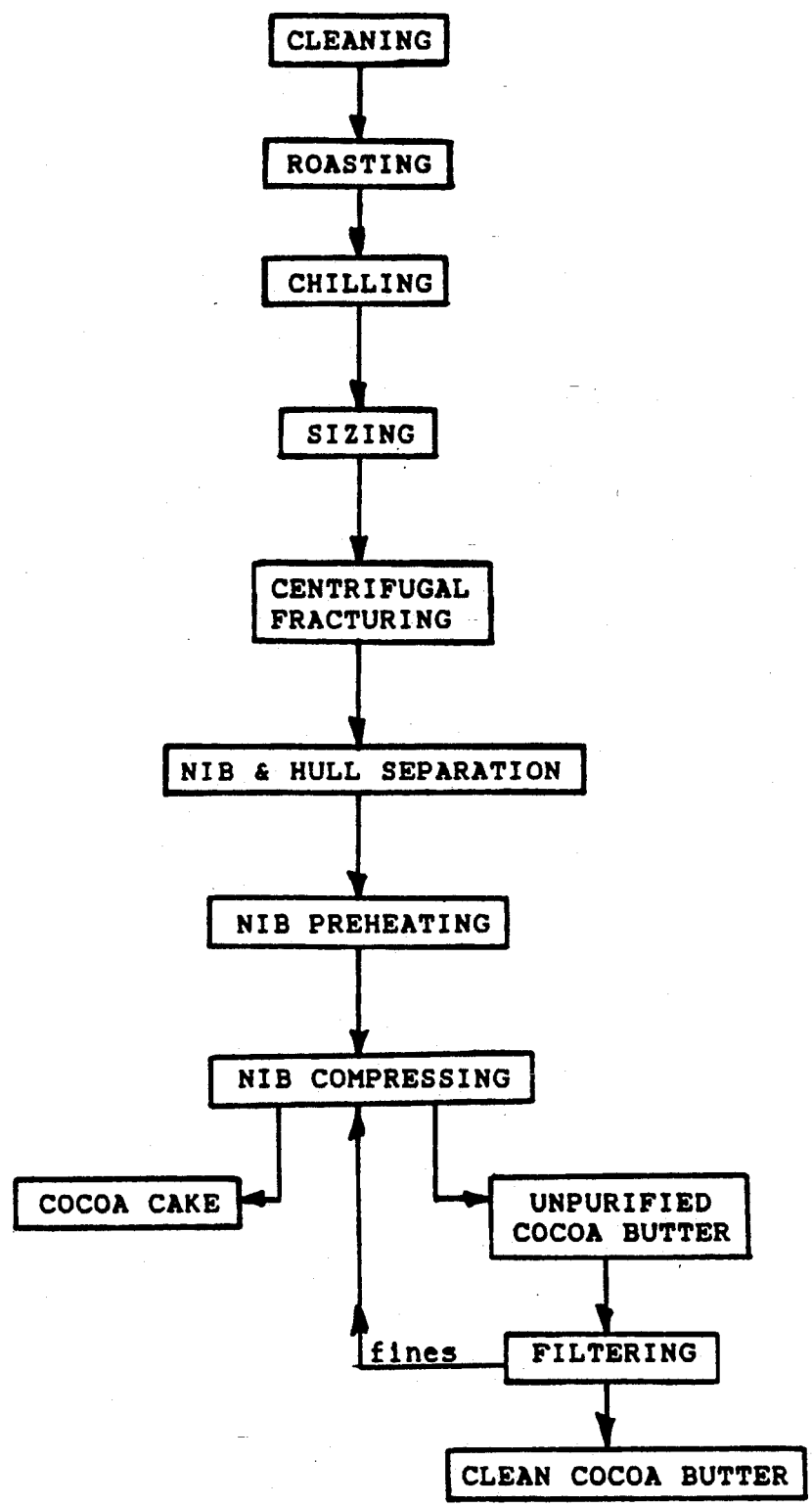
FIG. 4 is a view showing the flow diagram of the preferred form of my improved process for extracting cocoa butter and cake from cocoa beans.

Referring now to the drawings for a better understanding of my invention, I show in FIGS. 1 and 2 the composition and cross-sectional structure of a typical cocoa bean 10. It is shaped generally like an almond seed and comprises an inner portion or nib 11 which is cover by a thin, hard shell or outer hull 12. Natural adhesion affixes the hull 12 around the nib 11 and traps moisture inside the bean. Upon impact, the cocoa beans fracture along natural fracture lines 13 of the inner portion or nib 11, as show in FIG. 3. Under normal conditions, the beans break into a multiplicity of nib and separate shell fragments with only a small portion of the fractured elements comprising shell fragments 12a attached to their fractured nib portions 11a.

The initial cleaning step of my improved process may be accomplished in a controlled environment where a predetermined volume of cocoa beans will be conveyed from a collection area and passed through an air aspirating unit where negative pressure will be used to remove small immature cocoa beans, loose dust and dirt collected with the commercial cocoa beans during harvesting. The size and speed at which such aspirating unit operates will depend on the type and quality of bean being processed as well as the volume flow rate of beans passing through the unit. In the preferred form of my invention, I utilized a vertically oriented aspirating unit which is designed to process approximately 20,000 lbs./hour(9072 kg/hr) of dry cocoa beans. For this volume flow rate of beans, I have found that approximately one inch or 2.54 centimeters(cm) to two inch or 5.08 cm of negative pressure, but preferably 1½ inches or 3.83 cm of negative air pressure removes the dust, dirt and light immature beans collected with most types of commercial beans during harvesting.

After the beans are subjected to the initial air aspiration cleaning, they are then passed through a screening operation where large nubbins(clumps of beans), strings, fines and foreign material collected during harvesting and not removed by the air aspirating cleaning are removed. In this step of my preferred embodiment, I utilized a first vibrating screen of a predetermined size sufficient to process 20,000 lbs./hour(9072 kg/hr) of commercial cocoa beans. This screen will be set to operate at a predetermined speed sufficient to capture as overs thereon the large nubbins and stick and limb fragments entrained with the beans during harvesting. This captured material may be saved for separate processing to breakup the cocoa beans in the nubbins. The first vibrating screen will have openings of a size which will permit desired size cocoa beans and similar size insect fragments, small foreign particles, broken beans, rocks and stones, etc. to pass as unders therethrough.

A second vibrating/sifting screen of a predetermined size is positioned to receive the unders from the initial vibrating screen. This second screen is provided with opening of a size which will permit bean fines, broken beans, foreign material and insect fragments to pass as unders therethrough while capturing as overs the desired cocoa bean along with similar size rocks and stones. The unders from this second vibrating/sifting screen is captured for subsequent disposal.

The desired size cocoa beans along with similar size stones and rocks still entrained therewith are then transported to a destoning operation which is designed to remove the rocks and stones still commingled with the beans. A gravity-type air injection vibrating separator is utilized in this step with the cleaned and desired size cocoa beans being moved to one end of the separator while the heavier rocks and stones are moved in an opposite direction toward the other end of the air separator. This is accomplished by injecting air up through the vibrating separator bed with the lighter cocoa beans being lifted and moved toward one end of the separator while the heavier stones and rocks are moved by the reciprocating motion of the separator bed in the opposite direction toward the other end of the separator bed.

After the cocoa beans have been cleaned and destoned they are then transferred to a weighing/sampling station which evaluates the efficiency of the cleaning and destoning operation. In actual practice, a trapezoidal shaped hopper of a predetermined size and having conventional weight scaling sensors is utilized to measure the amount of cleaned cocoa beans in the process at this point. The weighing/sampling station checks the receiving product for moisture, quality and maturity of the bean as well as for fatty acid content. Depending on the predetermined volume of receiving product being cleaned and destoned, a one to three per cent removal by weight of rocks, stones and foreign matter entrained with the commercial cocoa beans may be achieved with my cleaning and destoning operation. While I have described the use of a trapezoidal shaped hopper to be utilized in the weighing/sampling station, it will be apparent to those skilled in the art to which my invention relates that other types of weighing and sampling apparatus may be employed to weigh and sample the clean cocoa beans.

A linear roaster receives the cleaned and destoned cocoa beans from the bean weighing station. The linear roaster subjects the beans to heat for a predetermined period of time. In the preferred form of my invention, the predetermined volume of cleaned and desired size cocoa beans are roasted by heating the beans to a temperature, ranging from approximately 280° F.(151.8° C.) to 320° F.(160.0° C.) for approximately five to eight minutes. The length of time and the degree of temperature a continuous bed of cleaned cocoa beans is subjected to heat depends directly on the thickness of the bed of beans being heated and the type and quality of bean being processed. Controlled heat develops the flavor of the beans as well as kills bacteria carried by the beans. In addition, the controlled heat expands the inner nib and outer shell of the beans. In actual practice, I have found that for a 2 inch(5.08 cm) to 3 inch(7.62 cm) thick continuous bed of cocoa beans moving through a 10 foot (3.028 m) wide by 90 foot(27.252 m) long linear roaster beans heated to a temperature of approximately 300° F. or 148.9° C. for approximately seven to eight minutes roasts most types of commercial beans to a desired flavor and texture. The operator in this step of the process will have great latitude to roast the beans to a varying degree of roast depending on the quality of end product being produced. That is, depending on the type and quality of cocoa bean in the receiving product, the operator may roast the beans for a shorter period of time and at a lesser degree of temperature to produce lightly roasted beans while exposing the beans to greater temperatures for a longer period of time produces a darker roast.

Chilled air at a temperature ranging between 50° F.(10.0° C.) to 60° F.(15.6° C.) is applied to the beans immediately after roasting for a period of time ranging from approximately three minutes to seven minutes, but preferably five minutes. This returns the beans to a temperature ranging from ambient to approximately 90° F.(32.2° C.) as well as reduces the moisture trapped inside the cocoa bean. Approximately five to eight per cent of each cocoa beans weight is trapped moisture and this is reduced to approximately two or three percent by weight after roasting. Additionally, this rapid cool down step loosens the tightly affixed hull or outer shell(12) which surrounds the inner portion or nib(11) due to the fact that the hull shrinks at a different rate of contraction than the inner portion.

A sizing station which comprises a plurality of vibrating screens is utilized after the beans have been roasted and chilled to size the beans into predetermined groups according to their physical size with the larger beans being separated from the medium and smaller size beans. In the preferred form of my invention, I utilize two vibrating screens to divide the beans into three size groups. A first vibrating sizing screen captures as overs the larger beans while its unders are passed through to a second sizing screen. The overs from this second screen are captured as the medium size group of beans while the unders of this screen are captured as the small beans. Each size group of beans is stored in a separate surge hopper for subsequent processing. While I have described only dividing the beans into three size groups, it will be apparent to those skilled in the art to which my invention relates that the beans may be divided into more or less than three size groups depending on the physical characteristics of the batch of beans being processed.

Figure 5:
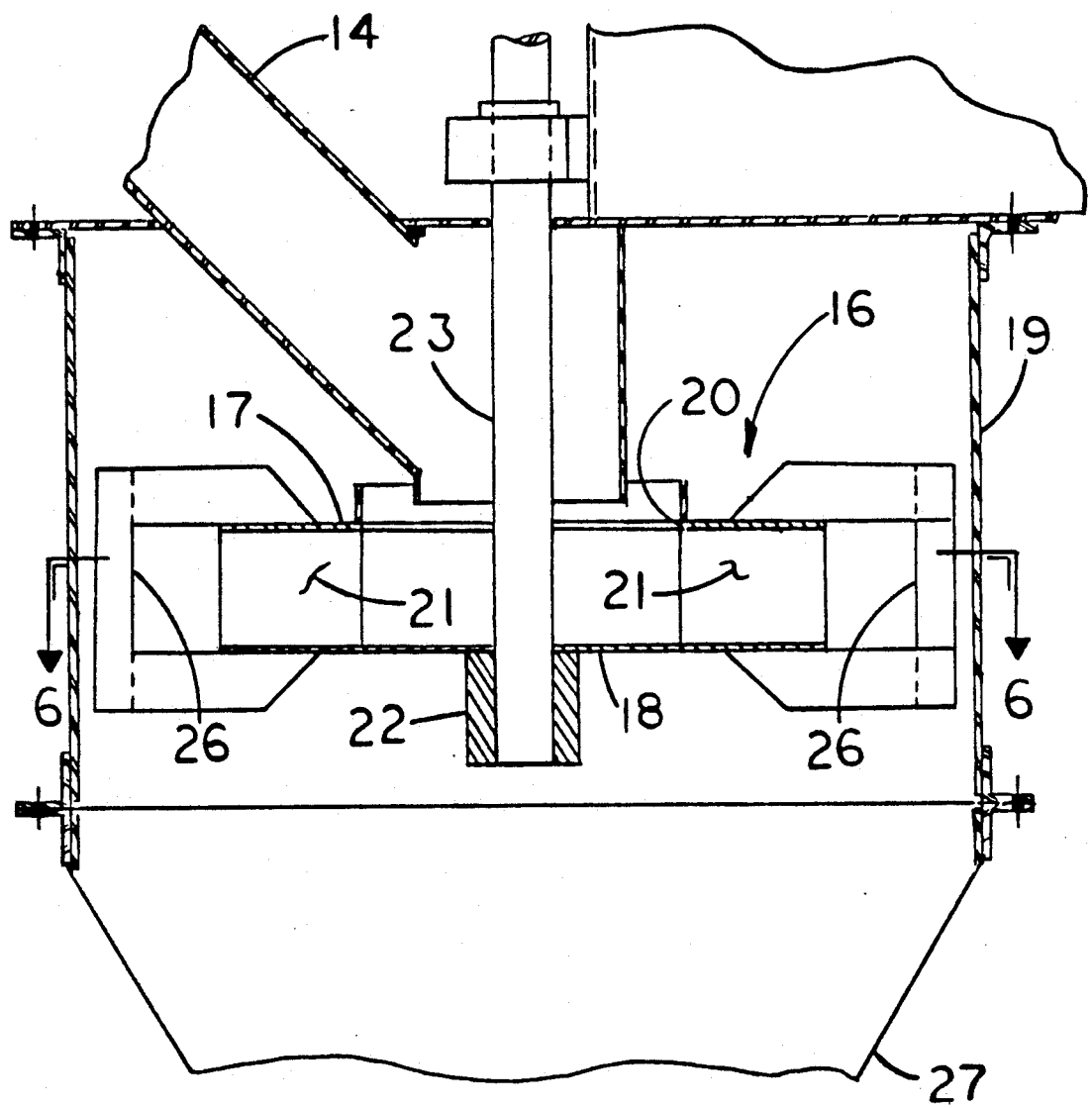
FIG. 5 is a cross-sectional view showing the centrifugal shell cracking device employed in my improved process; and, FIG. 6 is a view taken along the line 6—6 of FIG. 5.
Figure 6:
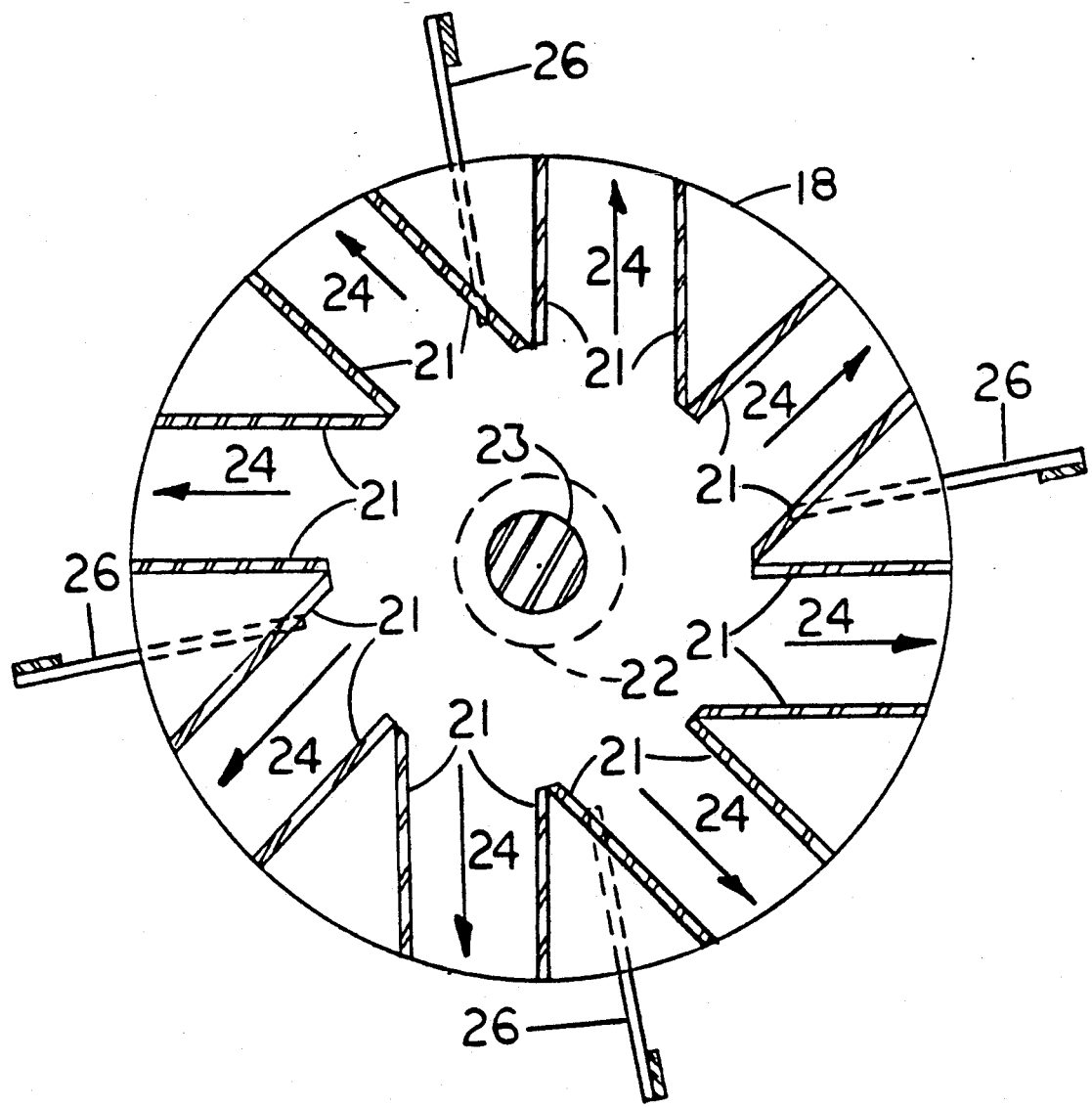

An improved cocoa bean impactor or shell cracking unit shown in FIGS. 5 and 6 is employed in the next step of my invention. It is constructed and arranged to fracture a continuous stream of beans along the natural fracture line of the nib of the beans. In the preferred form of my invention and based on a predetermined volume of roasted beans being processed, I employ two units each with the large and medium size group of beans and one unit with the small size group of beans. Each unit is adapted to receive a controlled flow of beans from its surge hopper and with the use of centrifugal force, route all the cocoa beans during their first pass through the impactor into a controlled contact with a clean target area. In FIG. 5, I show an inlet 14 in position to receive a controlled stream of beans from its surge hopper not shown. The beans fall by gravity from their respective surge hopper into one end of a vibrating pan assembly also, not shown. The vibrating motion of the pan assembly associated with each hopper causes the beans to move in a controlled manner toward an opposite end of the pan with a controlled amount of beans falling from the pan into the inlet 14. As the beans enter the inlet 14, they fall by gravity downwardly into contact with a fragmenting assembly 16 which comprises spaced apart upper and lower annular plate-like members 17 and 18, respectfully. The assembly 16 is enclosed in a housing 19 formed by an annular plate-like member.

Spaced apart, generally radially extending parallel vane members 21 are mounted between the plate-like members 17 and 18, as shown in FIG. 6. A conventional collar 22 and shafting arrangement 23 is employed to rotate the fragmenting assembly 16 in a counterclockwise direction as shown. The spaced apart vane members 21 form radially extending longitudinal paths of travel which direct the beans radially and outwardly from the center area of the assembly 16 and into contact with a clean, generally annular shaped target area, as shown. That is, as the cocoa beans enter the impacting unit through an opening 20 in the upper plate-like member 17, they fall downwardly into contact with the center area of the lower plate-like member 18. The spaced apart and parallel vane members 21 work concomitantly with the centrifugal force created by the counterclockwise rotation of the assembly 16 to direct the stream of beans to move radially and outwardly in all 360 degree directions through the longitudinal paths of travel formed by the vane members 21 and into contact with the generally, annular shaped wall of the exterior housing 19 as indicated by arrows 24 shown in FIG. 6. The pointed juncture and spaced apart parallel arrangement of the vane members 21 work in combination with the centrifugal force created by the counterclockwise rotation of the assembly 16 to break up the continuous stream of beans striking the center area of the lower plate-like member 18 into fragmental segments of beans which travel between through the longitudinal paths formed by the parallel vane members 21 and into contact with the inside surface of the annular housing 19. As the assembly 16 rotates, new fragmented segments of beans moving radially and outwardly through the longitudinal paths, strike clean and unencumbered areas of the inside surface of the annular housing 19. This impact with the inside surface of the annular housing 19 cracks and fractures the beans along the natural fracture lines of their nib and produces more desired size pieces of nib and affixed hull(larger plump pieces) than conventional processes of which I am aware. In actual practice, I have found that the smaller the cocoa bean to be fractured, the faster the impacting unit must operate to produce the desired size pieces of nib and affixed hull.

A plurality of spaced apart cleaning elements 26 are carried by the upper and lower plate-like members 17 and 18, respectfully, to clean the inside surface of the annular housing 19, as shown. The elements 26 are formed from bar-like members which are fixedly secured to the plate-like members 17 and 18 as shown. The cleaning elements 26 remove any nib and shell fragments which may collect on the inside surface of the annular housing 19.

A screening, vibrating conveyor positioned below the bean impacting units receive the cracked particles of nib and hull. The vibrating conveyor is utilized to screen out fine particles of nib and hull. In actual practice, I utilize a screening, vibrating conveyor having openings of 6/64 inch(0.24 cm) to capture as overs thereon the desired size particles of nib and hull. The overs from this conveyor are deposited in a collection hopper to await further processing. Small particles of fine nib and hull fall through this screening conveyor as unders and are sent to a shaker screen in nib reclaiming which will be described later in this description.

A second air aspirating unit is positioned beneath the collection hopper receiving the overs from the screening, vibrating conveyor. This aspirating unit is employed to remove lightweight pieces of hull and fine materials produced in the shell cracking impactor units. These materials are captured and sent to a nib reclaiming station to be described later in this description. In actual practice, I utilize a second vertically oriented air aspirating unit which is designed to operate between approximately ¼ inch or 0.635 cm to 1 inch or 2.54 cm of negative pressure to process 20,000 lbs/hr(9072 kg/hr) of fractured hull and nib particles. Fragmented particles of nib and hull are transferred in a controlled manner from the collection hopper receiving the nib and hull from the screening conveyor and passed through the aspirating unit to remove the lightweight particles of hull and nib created by the hull fracturing operation.

A nib separating screening station receives the fractured hull and affixed nib particles from the second aspirating unit. This screening station initiates the separation process of the hull fragments 12a from their affixed nib particles 11a and is sized to process approximately 20,000 lbs/hr(9072 kg/hr) of product. The nib screening station comprises a first vibrating/sifting nib separating screen which has openings of a size that permit predetermined sized particles(unders of nib and hull) to pass therethrough while capturing as overs on this screen, small unfractured beans and fractured nib particles to big to be removed by the second air aspirating unit. The overs are conveyed to a re-run shell cracking unit which is identical in structure to the shell cracking units described above.

The re-run impactor is set to operate at a predetermined speed which is dependant on the makeup of the material being reclaimed. In actual practice, I have found that the re-run shell cracking unit must operate at a speed faster than any of the other units to fracture the small particles passing therethrough. Fragmented particles which are passed through this re-run step are again sent to the second screening station to undergo hull and nib separation.

A second nib separating vibrating/sifting screen within this nib separating screening station is positioned to receive the unders(desired size pieces of nib and hull particles) from the first nib separating screen. This second nib separating screen is of a predetermined size and is designed to operate at a predetermined speed sufficient to process approximately 20,000 lbs/hr(9072 kg/hr) of product. This second screen is provided with openings of a size which cause the screen to capture as overs thereon desired size mixed particles of fractured nib and hull. Unders from this screen are smaller mixed particles of fractured nib and hull.

A first nib extracting gravity type separator is positioned to receive the overs from the second nib separating screen. A second nib extracting gravity type separator is positioned in close proximity to the first nib separator and receives the unders from the second nib separating screen. Each of the nib separators operate in a similar matter as described above with the destoning air injection separators which are utilized to remove rocks and stones entrained with the cocoa beans during harvesting. Air is injected up through the vibrating bed of the each of the nib separators to lift the lightweight, undesirable hull material and move it to one end of the separator bed. The heavier, desired size particles of nib is moved to the opposite end of the bed and then transported to a second common collection bin for weighing and sampling. The lightweight, incompletely processed material from the first nib extracting separator is sent to the second nib extracting separator for further processing. The lightweight rejected material from the second nib extracting separator is sent to nib reclaiming which will be described below. The second weighing and sampling station comprises a collection hopper which receives the nib from the nib separators. Conventional scaling apparatus and sampling equipment is utilized to sample and measure the nib yield. This station operates in a similar manner as described above with the bean weighing and sampling station. A holding tank of a predetermined size receives the nib after weighing and sampling. This holding tank is utilized in my process to maintain a constant and controlled flow of material through the remaining steps of the process.

Nib reclaiming is utilized in this process to remove small particles of fragmented nib still commingled with the lightweight, incompletely processed material from both nib separators. Nib reclaiming comprises a first nib reclaiming gravity type air injection separator which operates in a similar manner as described above with the separators utilized in the destoning operation and in the nib separating operation. Air is injected up through a separator bed to lift and move to one end thereof, the lightweight particles of undesirable hull fragments while desirable fragments of nib are moved to an opposite end of the separator bed. The desirable fragments of nib are removed from the nib reclaiming separator and blended with the desirable nib from both nib separators which is collected in the second weighting and sampling station and deposited in the nib holding tank.

A first nib reclaiming vibrating screen in close proximity to the nib reclaiming separator receives the lightweight, undesirable hull and nib fragments from the nib reclaiming separator. This nib reclaiming vibrating screen is of a predetermined size sufficient to process 3400 lbs/hr(1542.3 kg/hr) of product and has openings of a size to permit nib and hull fines to fall therethrough while capturing as overs thereon hull fragments which are removed from the screen and placed in bags for shipment out of the facility. A second nib reclaiming vibrating screen receives the nib and hull fines from the first nib reclaiming vibrating screen. This second nib reclaiming screen is designed to capture as overs thereon nib and hull fragments which are recycled to the second nib extracting gravity separator for a second processing. Unders from this second nib reclaiming screen are transported to a separate collection bin to await subsequent processing.

Nib passes from the nib holding tank to a second nib weighing and sampling station where the nib is rechecked for quality and nib yield. After weighing and sampling of the nib is complete, heat is applied to the nib for a predetermined period of time sufficient to elevate the nibs' temperature from ambient to a range from approximately 155° F.(68° C.) to 200° F.(93° C.). This facilitates cocoa butter and cake extraction from the nib. In actual practice, I utilize a rotating shaft having a product moving lug thereon to move the nib in a controlled manner through an indirect steam preheater to elevate its temperature. With most nib, elevating its temperature from ambient to approximately 155° F.(68° C.) provides efficient cocoa butter and cake extraction from the nib. After heating the nib, it will be conveyed to a plurality of pressors which will compress the heated nib to extract low fat cocoa cake and cocoa butter. In the preferred form of my invention, I utilize five pressors with each processing approximately 2000 lbs/hr or 907 kg/hr of preheated nib to produce low fat cake, unfiltered cocoa butter and fine material. The cake will be directed to a collection conveyor and then fluidized (broken into small pieces) to bulk storage silos.

A first cocoa butter holding tank receives the unpurified cocoa butter and fine material expelled from the pressors. It is transferred in a controlled manner from the holding tank to a centrifuge which removes the fine materials from the unpurified butter. The fine materials are then conveyed to a fines holding tank for subsequent processing while the unpurified butter is passed to a second cocoa butter holding tank for further processing.

A cloth filter press positioned in close proximity to the second butter holding tank is adapted to receive the unfiltered butter from the holding tank and remove further fine material while concomitantly producing clean cocoa butter. A heated holding tank receives the clean cocoa butter from the filter press and maintains it in a soluble state prior to its transfer away from the site. The fine material removed by the filter press is transferred to the fines holding tank described above. Predetermined amounts of heated cocoa butter is mixed with this fine material in the fines holding tank. This mixture of heated cocoa butter and fine material is recycled in the process by introducing it with the heated nib particles prior to their entry into the pressors.

The invention is further illustrated, but not limited by the following:

EXAMPLE 1

Commercial cocoa beans received from Cameroon and having a moisture content of six to eight percent by weight were deposited in the bean receiving area. They were then conveyed by a vertically oriented elevator conveyor to the inlet for the first aspirating unit. With the aspirating unit set to operate at 1½ inch(3.81 cm) of negative pressure, the beans were passed in a controlled manner therethrough. Lightweight matter(dust, dirt, immature cocoa beans, etc.) was removed from the flow of beans. The beans then were transported to the initial screen of the first screening station. This screen was provided with openings of ⅝ inch(1.59 cm) in diameter. The beans were passed through this vibrating screen with beans and entrained foreign matter of a smaller size than the openings falling therethrough as unders while limb and stick fragments and clumps of beans larger than the openings remain on the screen as overs. The overs were removed and saved for processing at a later time to reclaim the beans in the clumps.

The second vibrating screen in this first screening station was provided with openings of 10/64 inch(0.41 cm) in diameter. This second vibrating screen received the unders from the first screen and captured as overs thereon the desired size cocoa beans along with similar size rocks and stones. Unders from this screen which included bean fines, broken beans, foreign matter, dirt and insect fragments were passed therethrough and disposed of.

The overs from this second vibrating screen were sent to the gravity separator in the destoning station. The similar size rocks and stones commingled with the desired size cocoa beans at this point were removed. The cleaned and destoned beans were then weighed and stored in the beans holding tank with two percent of the receiving product removed by the cleaning and destoning steps.

From the weighing station, the cleaned beans were sent to the 10 ft.(3.028 m) by 90 ft.(27.52 m) linear roaster. The beans were arranged in an approximately 2½ inch(6.35 cm) thick bed on the linear roaster. They were heated to a temperature of 300° F.(148.9° C.) for seven minutes. Immediately after heating the beans were subjected to chilled air at 55° F.(12.8° C.) for five minutes. This returned the beans to near ambient. From this point, the beans were placed in the bean holding tank to await subsequent processing.

From the bean holding tank, the beans were passed in a controlled manner to the sizing station where two vibrating screens, the first screen having 22/64 inch(0.86 cm) openings and the second screen having 19/64 inch(0.76 cm) openings, divided the beans into three size groups(large, medium and small). Each size group of beans were then stored in a hopper prior to passage of the beans through its centrifugal shell cracking impactor.

Prior to impacting, each size group of beans were passed through a vibrating pan assembly which was utilized to control the flow of beans into its impactor. The two impactors for the large size and the two impactors for the medium size group of beans was set to rotate at 850 rpm and 950 rpm, respectfully. The single impactor for the smaller size group of beans was set to operate at 1050 rpm. As each size group entered its impactors or impactor as the case may be, the beans under a controlled flow fell downwardly by gravity into engagement with the counterclockwise rotating lower plate-like member 18. The centrifugal force created by the counterclockwise rotational movement of each impactor caused the beans to move radially and outwardly from the center of the impactor and strike the inside surface of the outer, annular wall of the housing of the impactor. This fractured the beans along the natural fracture lines of their nib. The fractured hull and nib particles fell downwardly to a screening, vibrating conveyor located below each impactor.

From the vibrating conveyor, the fractured nib and hull particles were then sent to the second vertically oriented air aspirator. This unit was set to operate at 1 inch(2.54 cm) of negative pressure and removed the lightweight pieces of hull and nib fine materials produced in the impactors. This undesirable lightweight material was sent to the nib reclaiming station.

The desired size nib and hull particles which passed through the second air aspirating unit is then sent to the first nib separating/vibrating screen which was provided with openings of 20/64 inch(0.79 cm) in diameter. This screen was set to operate at a speed to process approximately 20,000 lbs/hr(9072 kg/hr) and capture as overs thereon undesirable fractured nib particles and small unfractured beans. These overs were sent to the re-run shell cracking impactor to refracture these large pieces into desired size particles of nib and hull.

Unders from the first nib separating screen were passed to the second nib separating screen which was provided with openings of 17/64 inch(0.69 cm) in diameter. This screen was set to operate at a rate of approximately 20,000 lbs/hr(9072 kg/hr) and captured as overs thereon desired size pieces of hull and nib while small pieces of hull and nib passed therethrough as unders. The overs from this second nib separating screen was sent to the first nib extracting gravity separator while the unders were sent to the second nib extracting gravity separator. The desired size particles of nib captured on each of these gravity separators were removed and then weighed and sampled for quality and nib yield. After the initial weighing and sampling, the nib was transported to the nib holding tank while the lightweight, unfinished material from the first nib separator was sent to the second nib separator and the unfinished material from the second nib separator was sent to nib reclaiming for recycling.

The desired nib particles in the nib holding tank were then re-weighed and sampled at this point with ninety-five percent of the available nib being achieved. After the second weighing, the nib was passed to the feed screw which was utilized to control the flow into the steam preheater with the overflow therefrom being sent back to the second weighing station to be reintroduced to the process. The preheater elevated the temperature of the controlled flow of nib passing therethrough to 155° F. (68° C.). The nib was then sent to the pressors where approximately 2000 lbs/hr(907 kg/hr) of nib was processed by each pressor to produce low fat cake, cocoa butter and fines material. The cake was then fluidized(broken into small pieces) and then sent to bulk storage. The unfiltered cocoa butter and fines material produced by the pressors was then sent to the centrifuge which was set to operate at approximately 4000 rpm. A majority of the fines were removed by the centrifuge and then deposited in the fines holding tank. The cocoa butter from the centrifuge was then passed through the cloth filter press to remove more fines material and produce clean cocoa butter. The fines material from the filter press was sent to the fines holding tank while the clean cocoa butter was placed in the heated holding tank for shipment. The fines material in the fines holding tank was recycled to recapture even more nib by mixing it with cocoa butter from the heated holding tank and then injecting the mixture of heated butter and fines into the inlets of the pressors to be mixed with preheated nib.

EXAMPLE 2

Commercial cocoa beans from Indonesia having a moisture content by weight of 5 to 6 percent were delivered to the bean receiving area. They were cleaned and destoned in the exact same manner and operating conditions as described above in Example 1. The beans were roasted at 305° F.(152° C.) for 6½ minutes and then cooled to near ambient with chilled air at 55° F. (12.8° C.). The beans were sized and passed through the impactors in the same manner and operating conditions as with Example 1. A nib yield of 95 percent of available was achieved. After weighing and sampling, the nib was preheated to 158° F. (70° C.) prior to entry into the pressors. Cocoa cake and unfiltered cocoa butter was collected from the pressors in the same manner as in Example 1 with yields of cake from the pressors and clean cocoa butter from the filter press being substantially the same as with Example 1.

By means of the process of the present invention, yields of nib in excess if 95 percent of available have been obtained. It is possible with my improved process to adjust operating conditions of the various steps for different quality of cocoa beans received. A major advantage of my improved process, in contrast with existing processes is that the end product of cocoa cake and butter is produced with less than 1.75 percent of hull.

While I have shown and described the improved shell cracking impactor units as rotating in a counterclockwise manner, it will be apparent to those skilled in the art to which my invention relates that the impacting unit may be designed to rotate in the opposite direction to achieve the improved shell cracking results described above.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A process for extracting cocoa butter and cake from cocoa beans with each of said beans having an outer hull affixed around an inner portion, with said process comprising;
   a. cleaning a predetermined volume of cocoa beans to remove undesirable foreign matter and lightweight immature beans entrained therewith during harvesting,
   b. heating said beans to a temperature ranging from approximately 280° F. to 320° F. for a period of time ranging from approximately 5 minutes to 8 minutes,
   c. cooling said beans immediately after heating for a period of time ranging from approximately 3 minutes to 7 minutes with chilled air at a temperature ranging from approximately 50° F. to 60° F. to thus reduce said beans to a temperature ranging from approximately ambient to 90° F.,
   d. dividing said predetermined volume of beans into a plurality of groups of beans with the beans in each of said group being of a predetermined size,
   e. fracturing each of said group of beans of a predetermined size along natural fracture lines of said inner portions by passing the beans of each said group under centrifugal force through a rotating assembly which divides the beans of each said group into fragmental segments and concomitantly directs the beans of each said fragmental segment to move at a predetermined speed from a central area within said assembly radially and outwardly in all 360° through a multiplicity of longitudinal paths and into contact with a generally annular shaped target area,
   f. separating fractured inner portions from hull fragments and affixed hull fragments,
   g. subjecting fractured inner portions free of affixed hull fragments to heat for a period of time sufficient to elevate the temperature of said inner portions to a temperature ranging from approximately 155° F. to 200° F.,
   h. compressing said heated inner portions to extract cocoa cake and butter therefrom; and,
   i. filtering said butter to extract cocoa butter therefrom.

2. The process for extracting cocoa butter and cake from cocoa beans as defined in claim 1 wherein an impactor unit constructed and arranged to rotate in a counterclockwise direction exerts said centrifugal force on said beans.

3. The process for extracting cocoa butter and cake from cocoa beans as defined in claim 2 wherein said centrifugal impacting unit comprises,
   a. a housing having an annular exterior wall,
   b. a shaft extending generally vertically through said housing and being mounted for rotation therein,
   c. a pair of vertically spaced apart, generally horizontal annular plate-like members rigidly secured to said shaft and being positioned to rotate within said housing,
   c. therebeing an opening in the upper plate-like member for receiving cocoa beans entering said housing, and
   d. a plurality of pairs of spaced apart, vertical oriented, parallel plate-like vane members mounted between said annular plate-like members with end portions of adjacent vane members of adjacent pairs of vane members contacting each other at a pointed juncture to direct said beans entering said annular housing through said opening radially outwardly along said radially extending paths and toward said annular wall.

4. The process for extracting cocoa butter and cake from cocoa beans as defined in claim 3 wherein said annular plate-like members rotate in a counterclockwise direction to direct said beans entering said housing through said opening radially outwardly along said radially extending paths formed by said pairs of vertically extending vane members.

5. The process for extracting cocoa butter and cake from cocoa beans as defined in claim 1 wherein said beans are heated indirectly to a temperature of approximately 300° F.

6. The process for extracting cocoa butter and cake from cocoa beans as defined in claim 5 wherein said indirect heat reduces the moisture of said predetermine volume of beans and concomitantly expands said affixed hulls of said beans at a different rate of expansion than said inner portions of said beans.

7. The process for extracting cocoa butter and cake from cocoa beans as defined in claim 1 wherein said heated beans are returned to ambient by subjecting them to chilled air at a temperature of approximately 55° F.

8. The process for extracting cocoa butter and cake from cocoa beans as defined in claim 7 wherein said chilled air causes said affixed hull of said heated beans to contract at a different rate of contraction than said inner portions.

9. The process for extracting cocoa butter and cake from cocoa beans as defined in claim 1 wherein said predetermined volume of beans is divided into at least three different size range groups of beans.

10. The process for extracting cocoa butter and cake from cocoa beans as defined in claim 9 wherein vibrating screening means is utilized to divide said predetermined volume of beans into said different size groups with said means including a first vibrating screen having openings of a predetermined size which capture as overs thereon beans larger that the size of said openings and a second vibrating screen positioned to receive unders from said first screen and having openings of a size smaller than provided with said first vibrating screen with said second screen capturing as overs thereon beans of a size larger than the openings of said second screen while beans smaller than the openings of said second screen pass therethrough.

11. The process for extracting cocoa butter and cake from cocoa beans as defined in claim 1 wherein the heated inner portions free of affixed hull are compressed to extract cocoa cake, unfiltered cocoa butter and fines materials.

12. The process for extracting cocoa butter and cake from cocoa beans as defined in claim 11 wherein said unfiltered cocoa butter and fines material are passed through a filtering step to remove said fines material and produce cocoa butter.

13. The process for extracting cocoa butter and cake from cocoa beans as defined in claim 1 wherein said annular target area is cleaned with each rotation of said rotating assembly by cleaning elements carried by said rotating assembly in position to remove any inner portions collecting on said target area.

* * * * *